United States Patent Office 3,453,570
Patented July 1, 1969

3,453,570
VEHICLE HORN PROGRAMMER
Warner W. Clements, 13435 Java Drive,
Los Angeles, Calif. 90210
Original application Dec. 30, 1963, Ser. No. 334,245, now Patent No. 3,315,249, dated Apr. 18, 1967. Divided and this application Jan. 27, 1967, Ser. No. 612,128
Int. Cl. H01h 51/34; H01f 7/10
U.S. Cl. 335—93                 5 Claims

ABSTRACT OF THE DISCLOSURE

An automatic, self-powered switch for installation on vehicles employing a mechanical oscillatory system for switching events in time. The oscillatory system is shock-excited by a magnetic means to start the sequence, the natural period decreasing as the oscillations decline. Two separate switches are actuated at different time-intervals during oscillation of the system.

Introduction

Figure 5:
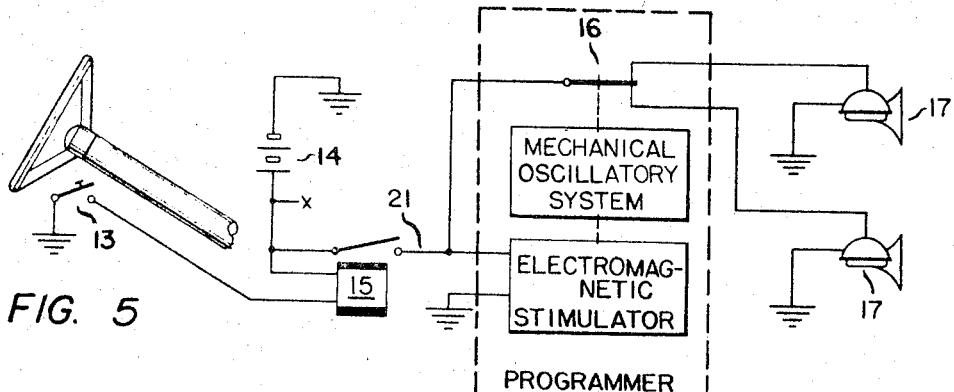

This is a division of my copending application Ser. No. 334,245, filed Dec. 30, 1963, now Patent No. 3,315,249 for Progammed Signalling System. The parent application set forth a signalling system for vehicles, which system serves to produce a novel and attention-compelling sound for signalling purposes. Only two horns need be incorporated in the system in order to produce this sound, said horns being tuned to respective pitches. The way in which a novel sound is elicited from the horns is through repeatedly interrupting the blast from each so that the resultant soundings are arranged according to a particular pre-scheduled time sequence, or "program." The program is one in which the horns first sound intermittently and alternately and then sound continuously and together. Further, in preferred versions the initial alternations are speeded up as the point in the program is approached at which the blasts of the respective horns merge and become continuous.

The parent invention contemplates that vehicles on which embodiments are installed shall have only the usual horn control contactor (often called the horn "button") and that the vehicle operator, in order to elicit part or all of the signalling program, need do no more than hold said contactor closed for an appropriate length of time. Obviously, some sort of automatic, self-actuating switch must be incorporated in the system in order to interrupt the circuits to the respective horns during the time that the horn control contactor remains in closed condition. However, there is no switching apparatus known to the prior art which is of a simple, unsophisticated type, and which will yet do the required job. The program which is required to be generated happens to be one which cannot be derived from any simple repetitive mechanical action. In particular, it should be noted that prior-art switches of the "periodic" type (e.g., those used for the flashing of turn-signal lights on vehicles) are completely incapable of generating such a program. Switches of the latter type can do no more than close circuits intermittently for as long as their actuating elements are energized. But to serve the purposes of the parent disclosure, they would have to actually count up a specified number of switch closures and, while still energized, change their switching action. Further, they would preferably have to have the capability of automatically shortening their natural period with each of the initial switch closures. Such capabilities are out of reach and out of character for so-called "periodic" switches.

The only switches to be found in the prior art which are capable of generating the program disclosed in the parent application are switches of some complication and sophistication. One type which will accomplish the purpose is the rotating-drum (or -cam or -cog) programming switch. The parent application discloses that rotating-drum switches and related types may be used in embodiments of the invention in its central or broader sense. But it also discloses an inventive switch which is simpler and more economical, but nevertheless capable of doing the same job. It is the latter switch which is the subject of the present application, and which will now be briefly described:

The switch of the present invention incorporates a rotatably mounted mass and means for resiliently biasing said mass toward predetermined positioning. These elements constitute a mechanical oscillatory system, inasmuch as the mass will necessarily rotate backward and forward with a distinct period when properly stimulated. The oscillatory system is a passive one, in the sense that it is dependent upon the introduction of external energy for initiating and/or maintaining oscillation. (In any physically realizable oscillatory system of this sort, energy introduced into the system does not remain there indefinitely, in kinetic or potential form, but is rapidly dissipated, principally through the bearings impliedly supporting the mass to permit rotation.)

The operation of the invention requires that the oscillatory system be stimulated, when indicated, into a particular mode of oscillation: It must execute a decaying train of oscillations. By "decaying train of oscillations" I specifically mean a series of oscillations in which there is a rapid initial buildup of amplitude followed immediately by a continuous, comparatively slow decline which culminates in an early extinction of the movements provided that they are not earlier interrupted. Taking energy considerations into account, it can be seen that the only way to stimulate such a wave train is to initially introduce a large bundle of mechanical energy into the system, and then subsequently either introduce no further energy while the oscillations decline, or else restrict subsequent introductions to bundles that are quite small by comparison with the initial one (each being required to be smaller than the frictional loss during the subsequent single cycle). Whether the initial "push" given the system is or is not followed by the smaller subsequent pushes amounts to the same thing. This is so because only the initial push represents a net gain of energy for the oscillatory system; any subsequent pushes would amount to no more a partial counteracting of unnecessarily high frictional back-forces.

In preferred embodiments of the invention the initial stimulus is confined to a single push. This push is delivered through an electromagnetic actuator of one form or another. The actual energy input into the oscillatory system may optionally be arranged to represent either kinetic energy imparted to the mass or potential energy imparted to the means biasing the mass toward predetermined positioning. The electrical energization for the electromagnetic actuator is arranged, in normal vehicle installations, to come directly or indirectly from the horn control contactor circuit in order that every time the contactor is depressed (closed) a single major impulse will be delivered to the mechanical oscillatory system.

Two sets of switch contacts are required, one to control each of the two horns. These switch contacts are arranged to be actuated by the oscillations of the mechanical oscillatory system. They must be so mounted and connected thereto that they will be closed alternately while oscillations persist, but will both be closed in the absence of oscillations, at least in the presence of continuing electrical energization of the electromagnetic actuator.

This switch arrangement, which is found in no comparable prior art, is one of the concepts at the heart of the invention. Regarded along with the other construction features previously enumerated, it makes clear how the stipulated program is generated. Energizing the electromagnetic actuator will set the two sets of switch contacts to closing alternately in turn, but only for a specified (or approximately specified) number of cycles. After a certain length of time the oscillations will die down and this period, as well as the frequency of oscillation, can be set by the designer. When an embodiment is installed on a vehicle, as intended, the described series of events means that the operator of the vehicle need only depress his horn control contactor, and hold it down, to cause his horns to "warble" for a brief period and then merge their soundings into a continuous, simultaneous blast.

The inventive apparatus just described lends itself to an inventive refinement: It may be constructed in such a manner that the initial alternations of switch closures are speeded up as the point in the program is approached at which both sets of contacts close and remain closed. In other words, the frequency of the oscillations of the rotatable mass is increased as such oscillations die down. The improvement is achieved by arranging that the restoring force exerted by the means biasing the rotatable mass is less than directly proportional to the angular excursion of said mass away from the angular position toward which it is biased.

It is the purpose of the invention to provide a simple, reliable and economical means of generating the switching program taught in the parent application. This program is an advantageous one because it provides a compelling, attention-getting sound. It is further advantageous because it permits separate sounding of two horns without use of other than the usual simple SPST horn-control contactor. It is still further advantageous because it does not sacrifice the operator's ability to elicit the usual louder, simultaneous and continuous blast. He need only hold down the contactor for a brief period and such a blast will be forthcoming. Finally, the program is advantageous because it may be varied considerably by the operator simply by his eliciting longer or shorter portions thereof. (This ability is enhanced if the accelerating-frequency feature is incorporated.) For instance, if he sufficiently decreases the period for which he depresses the contactor, he can elicit a single "beep" from one horn only. This sound is ideal for courteously warning pedestrians. If helds down the contactor for just a little longer, say for three "notes," he produces a simple tune.

Since, other than the programming switch, the major elements of the signalling system of the parent application are already installed as the normal complement on modern automobiles, it follows that the switch of the present invention constitutes, by itself, a useful accessory which may be conveniently installed thereon at any time. Alternatively, it may be installed by the vehicle manufacturer as an item of original equipment.

Considering its function and intended application, the most succinct and descriptive term I am able to arrive at for the overall device of my invention is "horn programmer."

*Drawings*

FIGS. 1 through 4 are highly simplified and diagrammatic representations of four respective embodiments of the invention. (Only battery 14 and switch 15 in each case are exterior to the combination of the invention proper.) These drawings illustrate various principles of construction rather than actual practical constructions. In particular, it should be understood that it is only for purposes of simplicity and clarity that mass 18 is shown to be mounted for linear, as opposed to rotational, movement. All practical embodiments of the invention have the equivalent of mass 18 mounted for rotational movement. This is necessary because the intended environment of such embodiments is one in which they are subject to considerable vibration.

Figure 6:
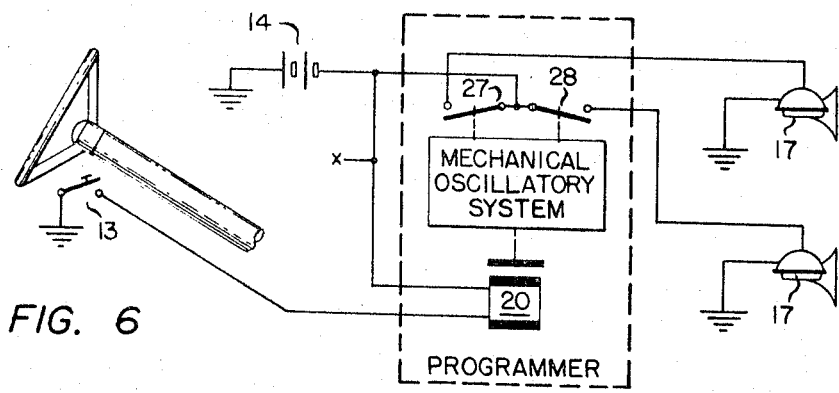

FIGS. 5 and 6 diagrammatically illustrate the manner in which embodiments of the invention are wired into the signalling systems they are intended to serve. The embodiments proper are designated in each case by the dashed rectangle bearing the legend "programmer."

Figure 7:
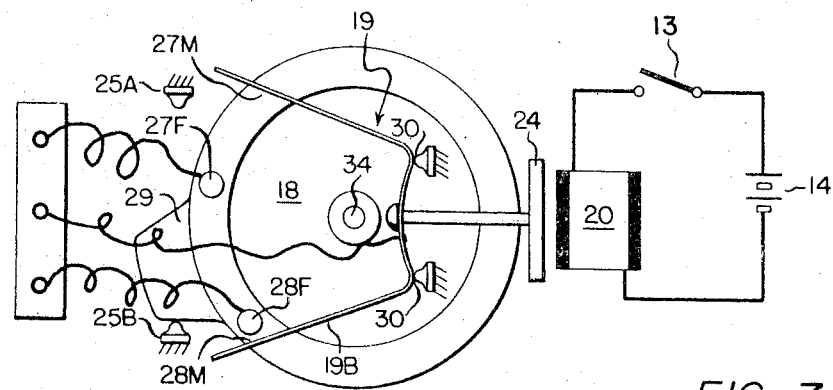
Figure 8:
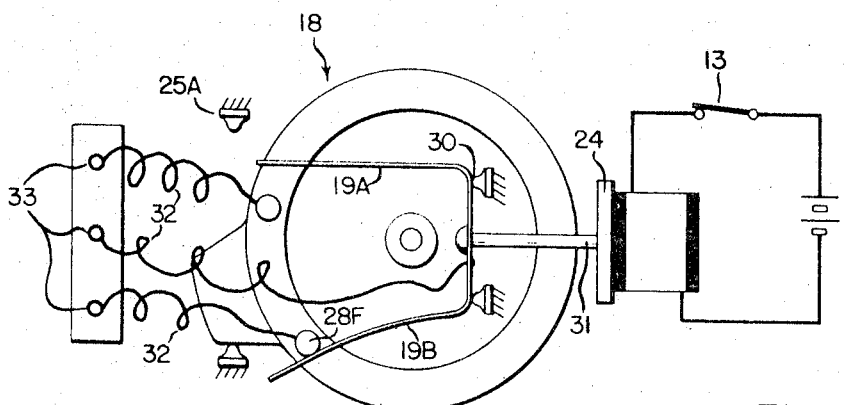
Figure 9:
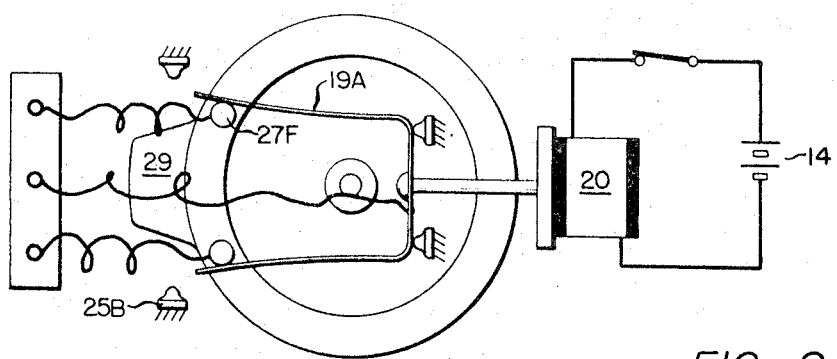

FIGS. 7 through 9 are partially diagrammatic representations of a simplified embodiment. The electromagnet 20 and associated circuitry are shown symbolically, while elsewhere inessential detail is omitted for the sake of clarity. FIG. 7 depicts the device under quiescent conditions. FIG. 8 shows it as it would appear immediately after energization. FIG. 9 represents it as it would appear after the dying down of induced oscillations.

Figure 10:
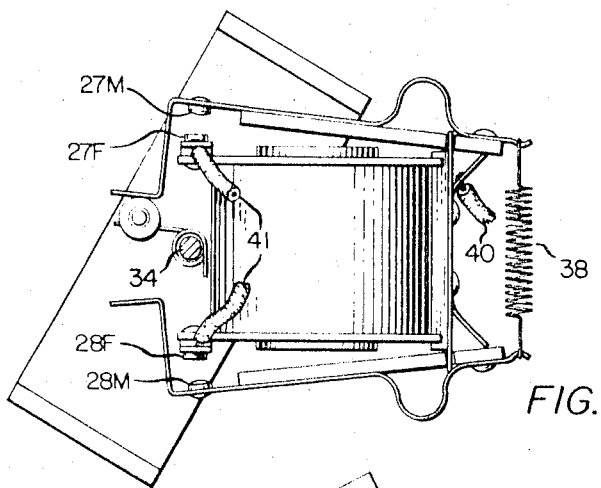
Figure 11:
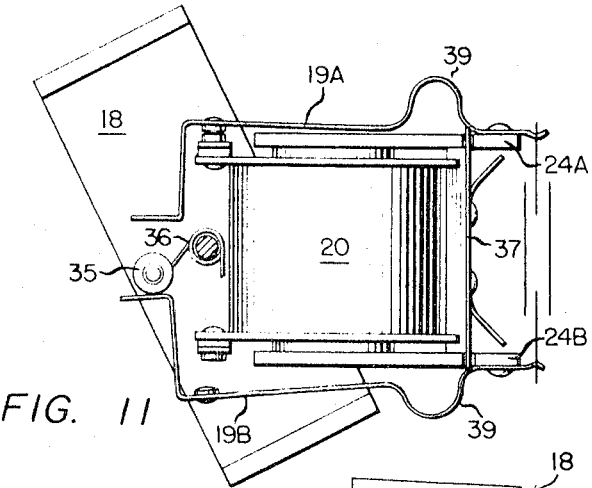
Figure 12:
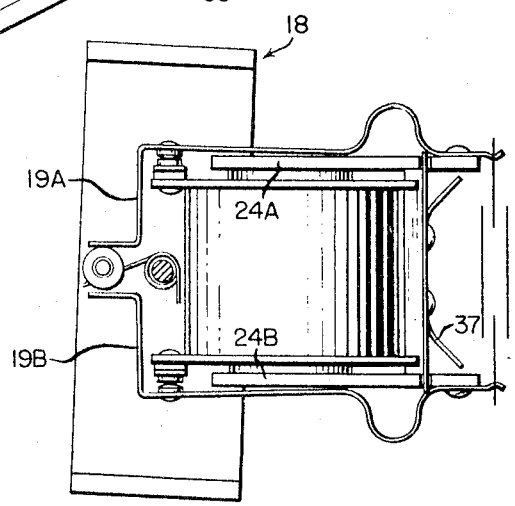

FIGS. 10 through 12 are drawings of a practical embodiment. The views are taken as they would appear in a sectioning plane between the mounting base and the principal components of the device, looking toward the latter. The views are thus, in a sense, inverted plan views, though it should not be inferred that there is any particular preferred mounting position for the device shown. Spring 38 is shown diagrammatically in the latter two of the figures. FIG. 10 depicts the device under quiescent conditions. FIG. 11 shows it as it would appear with rotatable mass 18 at the counterclockwise peak of an early oscillation. FIG. 12 represents the device as it would appear after the dying-down of induced oscillations.

In all embodiments shown, equivalent components are given the same reference character. Because of the large number of embodiments, it is felt that prime marks would only cause confusion; accordingly, such marks are dispensed with.

*Diagrammatic embodiments*

Attention is directed to FIGS. 1 through 4, which illustrate the principles of operation of a variety of more-concrete embodiments. Mass 18 is mounted to be movable. Spring 19 serves as a means for biasing it toward predetermined positioning. Insofar as mass 18 is shown mounted for linear, as opposed to rotational, movement, the arrangement is an expository rather than a representational one. That is to say, in practical embodiments the equivalent of mass 18 is mounted for rotational movement and the equivalent of spring 19 is a means for biasing it toward predetermined angular positioning. However, those skilled in the art will appreciate that in an idealized environment the two modes of motion are fully equivalent, with the one depicted being better adapted for simple comparison of the arrangements to be described.

The spring and the mass together constitute the mechanical oscillatory system. Electromagnet 20 and various associated elements serve as the electromagnetic means for mechanically stimulating the oscillatory system. Said means is arranged to be connectible to external circuitry from which to receive energization. In the subject drawings the external energizing circuitry is represented by battery 14 and switch 15, which together supply continuous D.C. energization for selective periods. The two requisite sets of horn switch contacts are indicated generally at 16.

Figure 1:
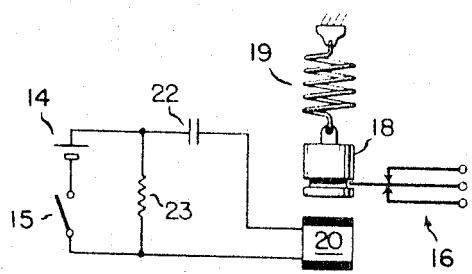
Figure 2:
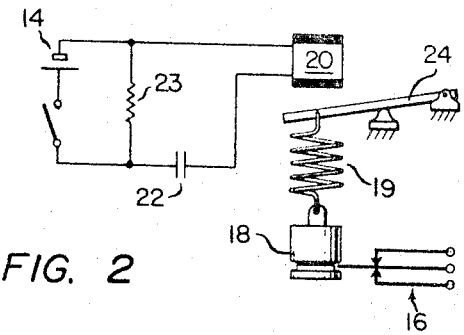

With particular reference to FIGS. 1 and 2, it can be seen that the objective of the stimulating apparatus is to cause mass 18 to oscillate about the particular position it is shown as holding in either case, and to finally come to rest in this same position when oscillations have died down. If this is accomplished, the two sets of switch contacts will be first closed alternately and then, after the predetermined number of cycles, will be closed simultaneously. Such a sequence is to occur in response to the closure and the holding closed of switch 15 (which represents the horn relay in a typical installation).

But study will show that should electromagnet 20 be energized continuously in either case, then oscillation of the mass would take place about a position removed from the quiescent position shown, and proper switch operation would not be secured. In other words, it is necessary to arrange that electromagnet 20 deliver a ballistic impulse instead of a step impulse. To the latter end, capacitor 22 and resistance 23 are included as essential parts of the overall stimulating means. These elements simply limit the flow of current in electromagnet 20 to a brief period determined by the time-constant of the combination.

The time constant must be set long enough in either case to allow mass 18 to attain full momentum before electromagnet 20 becomes de-energized. Besides the resistor-capacitor arrangement, there are others, which will be apparent to those skilled in the art, by means of which the current flow in electromagnet 20 can be cut off after a brief period. For instance, a relay having a short time delay can be incorporated into the device to serve this purpose. All such arrangements are clearly equivalent.

The only essential difference between the arrangement of FIGS. 1 and 2 is that in the first instance the magnetic attraction is exerted directly on the movable mass, and in the second instance it is exerted on armature 24, which in turn utilizes spring 19 for an instant for purposes of transferring energy to the movable mass. (Armature 24 is assumed to be quite heavy, so that it will withstand upward pushes by spring 19 in the course of the subsequent free oscillations of mass 18. In the rotational analog of the arrangement it is necessary to add a second spring to fulfill the same purpose.)

Figure 3:
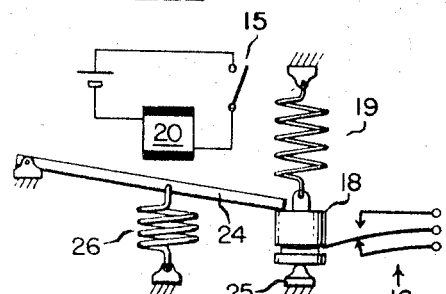
Figure 4:
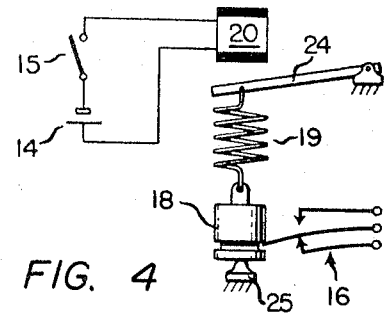

The embodiments of FIGS. 3 and 4 have in common the feature that there are actually two quiescent positions for the movable mass. If the electromagnetic stimulating means is de-energized, in either case, the position of the mass is against stop 25. On the other hand, if the stimulating means is energized beyond the period required for oscillations of the mass to die down, then said mass will come to rest at a point substantially midway of its permitted travel. It should be noted that it is the means for biasing the mass toward predetermined positioning, specifically a spring or springs, which determines both of the cited positions. Further, in both of the subject embodiments the stimulating impulse is applied as an input of energy into the respective springing systems. The structure can be generically described as one in which the electromagnetic means applies its stimulus directly to the biasing means of the oscillatory system in the form of a change in the position toward which the mass is urged.

Unexpectedly, this generic construction yields two unrelated benefits. The first is that the electromagnetic stimulating means is simplified, inasmuch as a step impulse will suffice, so that pulse-forming components, as represented by capacitor 22 and resistor 23 in the earlier figures, can be dispensed with. The second benefit is that a means is provided for quenching the oscillations of the mass under the circumstance that the electromagnetic stimulating means is de-energized in the middle of a previously generated train of oscillations. The quenching, in turn ensures that another decaying train of oscillations can almost immediately be started through fresh energization of the stimulating means. (Because of its important function just alluded to, stop 25 is hereinafter called a "quench stop.")

Further details of the operation of the embodiments of FIGS. 3 and 4 should be apparent from the figures. When electromagnet 20 is actuated, in either case, armature 24 is attracted to it and stays there for the duration of energization from the horn control circuitry. This causes mass 18 to execute a decaying train of oscillations, closing the respective pairs of switch contacts in switch 16 by turns until oscillations cease, at which time both sets are closed and remain so for the duration of energization from the horn control circuitry.

Installation hookup

FIG. 5 shows the wiring diagram for installation of embodiments such as those represented diagrammatically in the figures just discussed. The portion of the figure to the left of its center represents the "horn control circuitry." This is depicted as it conventionally appears on vehicles: Battery 14 energizes relay 15 when horn-control contactor 13 is closed, and this, in turn, causes the relay switch to close, energizing output wire 21. Thus, the horn control circuitry provides continuous D.C. energization for selective intervals, specifically, for those intervals during which the vehicle operator chooses to keep his horn "button" depressed.

In conventional signalling systems, output wire 21 would be connected directly to both horns. For purposes of the present invention it is, instead, connected to the embodiment, where it serves to energize the electromagnetic stimulating means and the two sets of contacts in switch 16. Each set of switch contacts, in turn, is connected to a respective horn circuit leading to a respective one of horns 17.

The purpose of a horn relay, on vehicles in general, is to keep the heavy current drawn by the horns from flowing through the horn-control contactor. Since horn relays are normally found on stock vehicles, the necessity for a horn relay in the hookup of FIG. 5 adds no difficulty or expense to the accessory installation of a horn programmer according to the present invention. However, certain species of the invention, yet to be described, make possible the elimination of the horn relay. This could be a distinct advantage in original-equipment-type installations.

Study of FIGS. 1 through 4 will indicate why it is that the embodiments represented thereby would not lend themselves to the elimination of the horn relay. In FIGS. 1 and 2, both sets of switch contacts remain closed under conditions of de-enerization of the device. In FIGS. 3 and 4, one set of the switch contacts remains closed. Thus, without the relay, at least one horn would honk continuously even in the absence of energization of the stimulating means in the devices.

By contrast, in the embodiments of FIGS. 7 through 12 the two sets of switch contacts are arranged to always be open when the electromagnetic stimulating means is de-energized. This arrangement is symbolized in FIG. 6 by means of showing separate mechanical connections (dashed lines) to actuate each of the sets of switch contacts. This amounts to having two separate switches, 27 and 28. One who studies the figure should understand that it is intended to convey that when electromagnetic actuator 20 (which constitutes the whole of the stimulating means) is de-energized, both switches 27 and 28 are open. When the actuator is energized the resultant oscillations of the mechanical system close the switches in turn. When the oscillations die down, both switches are closed unless and until the actuator is de-energized. Upon de-energization at any stage, both switches are opened. Thus, the programmer performs, not only its own function, but that of the horn relay as well.

Simplified self-relaying embodiment

This embodiment is illustrated in FIGS. 7 through 9. Mass 18 has somewhat the shape of a flywheel and is rotatably mounted to turn on an axis through its center. Under conditions where the electromagnetic stimulating means in the device is de-energized, mass 18 is biased to rotate as far counterclockwise as permitted. But under energized conditions, the mass is biased toward angular positioning central of its permitted travel. The biasing agency in the first instance is gravity, and in the second instance is spring 19. (From a functional standpoint, spring 19 is really two separate springs, designated as 19A and 19B respectively, FIG. 8 makes it clear how each spring functions separately to exert its force on the mass when said mass is in a corresponding sector of its total permitted range of angular travel. For this reason, springs 19A, 19B, and their equivalents are herein termed "sector springs.")

The electromagnetic stimulating means, represented in the instant figures by electromagnet 20 and armature 24, serves to stimulate the oscillatory system, upon demand, by means of changing the angular position toward which the rotatable mass is biased. More specifically, it does so by means of straightening out the curve in the central portion of spring 19, thus advancing both sector springs simultaneously.

One set of switch contacts is represented by conductive peg 27F and the corresponding point 27M on the inner surface of sector spring 19A. The other set of switch contacts is represented by peg 28F and surface 28M. The two pegs are mounted on the rotatable mass, and it is assumed that either the latter is non-conductive, or that they are insulated from it. Flexible pigtail leads run from the pegs and from spring 19 to terminals provided for connection to the exterior circuitry.

FIG. 7 depicts quiescent and de-energized conditions. If switch 13 (which represents the horn-control contactor) be closed under these conditions, the resulting advancement of the sector springs will result in the circumstances of FIG. 8, wherein sector spring 19B is exerting maximum tension on peg 28F. This not only closes one of the two horn circuits, but it starts the rotatable mass off with a push in the clockwise direction. Clockwise rotation will cease only when the resultant energy of the mass has been transferred to sector spring 19A, and it will then be the later which is flexed, while it will be contacts 27M and 27F which are closed. Subsequently, the mass will bounce back and flex the first spring, and so on. Due to energy dissipated in the switch contacts and in the supporting bearings, the rotational oscillations will quickly die down. After they do, and providing the electromagnetic actuator still remains energized, the circumstances of FIG. 9 will prevail, with the mass stationary in the position shown and with both sets of switch contacts closed.

Should switch 13 meanwhile or subsequently be opened, any kinetic energy in mass 18 will quickly be dissipated by collision with quench stops 25A and/or 25B. The positions of movable parts, consequently, will quickly become again those depicted in FIG. 7.

Since both sets of switch contacts in this embodiment are open under conditions of de-energization of the electromagnetic actuator, said embodiment may be installed on a vehicle in accordance with the wiring diagram of FIG. 6, and no horn relay need be used.

*Dual-armature embodiment*

This embodiment is illustrated in FIGS. 10 through 12. Rotatable mass 18 is made of heavy strap metal, with flanges at either end bent toward the observer. It pivots on shaft 34, which shaft extends toward the observer and anchors on the mounting base of the device. (In the views, the base is considered to have been chopped off by the projection plane.) Two stops limit the travel of the mass element to that between its position of FIG. 10 and a position rotated counterclockwise to slightly beyond that of FIG. 11. (The stops lie beyond the visible parts and so are not shown.) A bearing roller 35, mounted on a stud extending from the mass a short distance toward the observer, provides a low-friction drive point for same. A small helical spring 36 bears with one end against the stud of the bearing roller and with the other end against fixed structure (not shown) with a comparatively light tension biasing the rotatable mass to turn fully clockwise against its stop.

The electromechanical actuator of the embodiment comprises an electromagnet 20 and two armatures 24A and 24B. The electromagnet proper may be considered to comprise the usual core, coil, and fixed magnetic conductor extending along a side of same. (Wire connections to the coil are presumed, although these are not shown.) There is one departure from conventional construction, in that the electromagnet has two pole pieces, one at each end, instead of the usual single one. The armatures pivot on respective projections of a thin metal stamping 37 which serves various minor structural functions, including that of anchoring parts to the base through extensions not shown. This stamping is secured to the side magnetic conductor of the electromagnet. A spring 38 serves to hold both armatures, under quiescent conditions, in position retracted away from the pole pieces at distances limited by respective stops, said stops being provided in the form of additional projections from stamping 37.

Two sector springs, 19A and 19B, are preferably made of some material such as Phosphor bronze or beryllium copper. Each of these springs is mounted to a respective armature, being secured thereto at only one longitudinal point, namely, the point indicated by the rivet head near the pivot point in each case. Each spring is pre-tensioned, so that under quiescent conditions it is held flat against its armature. Most of the tension is caused to reside in loops 39. That is to say, in relaxed position the springs would have the same contour as that shown in the figures execpt that each loop would be more tightly closed and would form a greater portion of a circle. Likewise, most of the "give" when the springs are bent away from the armatures is caused to occur in these same loops. This latter effect is achieved by making the springs narrower, when viewed in their flat aspect, in the region of the loops. Preferably, the narrowing should be accomplished by the removal of material from the middle, in a lateral sense, of the spring material. In other words, the loops should appear in elevation each as two narrow straps. An inward extension of the free end of each sector spring is adapted to bear against roller 35.

Two sets of switch contacts are provided. One contact out of each of these two sets is mounted on a respective sector spring; these contacts are designated 27M and 28M. The other contact of each set is mounted to a respective flange of the electromagnet coil; the latter contacts are designated 27F and 28F. (The coil flanges are made of an insulating material such as fiber or plastic. In accordance with one common practice, such flanges may be integral with the bobbin on which the coil is wound.) Wire leads 40 and 41, shown broken short in FIG. 10, provide for connection to external apparatus. In an installation such as that of FIG. 6, lead 40 would eventually connect to the vehicle power supply, and leads 41 would connect to the respective horns. Lead 40, being connected to stamping 37, would preferably be augmented by a pair of pigtails connecting the stamping, in turn, to both sector springs. Such pigtails would overcome the effects of possibly poor contacts at armature pivot points. (For simplicity, no pigtails are shown.)

When the device is energized, the movable parts being in their quiescent positions of FIG. 10, the first thing that happens is that armature 24B is attracted to its pole piece, closing switch contacts 28M and 28F. Once this has occurred, the magnetic pull on the opposite armature is greatly increased, armature 24A thereby being enabled to close even against stiff bias from sector spring 19A. The latter spring resists because it must suffer its free end to stay put in space for the instant, the inertia of the rotor not permitting it to move appreciably in the time it takes the armatures to close. Soon the rotor does move, however, and acquires enough speed so that its momentum takes it to the position of FIG. 11. Meanwhile, switch contacts 28M and 28F have opened again, and contacts 27M and 27F have closed. The switch closings alternate again and again until the oscillations die down, the armatures remaining glued to their respective pole pieces all the while. The situation after oscillations have died down is shown in FIG. 12 (which can also be regarded as depicting the earlier situation as the rotor, in full flight, coasts past its central position). De-energization, prior to or subsequent to the decay of oscillation, restores the conditions of FIG. 10.

The reader should carefully note that the embodiment of FIGS. 10 through 12, although it bears little superficial resemblance to the embodiment of FIGS. 7 through 9, is constructed and functions according to the same basic principles. The two embodiments have in common the fact that the biasing means operative upon the rotatable mass includes, in either case, two normally retracted sector springs which are adapted, upon being advanced, to bias the rotatable mass from opposing rotational directions toward angular positioning central of its permitted range of rotation.

The two embodiments also have in common switch contact mounting arrangements which are identical in principle, although they differ in appearance. The construction in either case is one in which the switch contacts are so mounted that each is closed only under the circumstances that the sector springs are advanced, and the rotatable mass is in a given sector of its permitted travel. FIG. 8 should be compared with FIG. 11. In both figures the sector springs are shown as advanced. Because the rotatable mass is, in both instances, in the counterclockwise sector of its permitted travel, a given set of contacts is closed and the other set is open. Were the mass in the clockwise sector of its permitted travel, then it would be the other set of points which would be closed in each instance. (In FIGS. 9 and 12, both sets of contacts are shown as closed simultaneously. This is because the clockwise and counterclockwise sectors of travel of the rotatable mass can be considered to overlap in the middle.) Arranging these and other specific constructions to adhere to the stated generic structural principles is a task which falls within the capabilities of one with ordinary skill in the art.

Frequency-shifting feature

It has been mentioned that in preferred embodiments of the invention the speed of the alternations in closures of the two sets of switch contacts is caused to increase as the point in the switching program is reached at which both sets remain closed. In practice, this means that the natural period of the oscillatory system must be made amplitude-dependent, to the end that said period will decrease as the oscillations die down. It can be shown analytically that the proper conditions will obtain when the biasing means operable upon the rotatable mass is constructed to bias said mass with a force which is less than directly proportional to the angular excursion of said mass. To state these conditions in simple terms, what is meant is that, for instance, when the oscillations have died to a point where their amplitude is half of what it was initially, the peak restoring force exerted by the biasing means will at that point be greater than half of its respective initial value. In other words, the effective stiffness of the biasing means will have been increased and, with it, the "natural" frequency of the oscillatory system.

It remains to contrive a biasing means having the required nonlinear characteristic. It is not at all obvious how this may be done. Springs are non-linear when strained beyond a given point, but the nonlinearity is of the wrong sign and would tend to give oscillations which slow as they decline. However, I have discovered a simple way to get the required characteristic from ordinary springs. What I do is to pre-stress them at their point of minimum strain.

As an example of pre-stressing, attention is directed to FIG. 12. In the embodiment represented, and in the circumstances depicted, springs 19A and 19B are both exerting force against their respective opposing fixed contacts. From this it is clear that whenever the rotatable mass departs from the neutral angular position shown it will immediately encounter a restoring force of some size. As it departs further, it will encounter an increased restoring force, but though the force increases, it must perforce continue to be less than directly proportional to the angular excursion. (For instance, an excursion three times as large as the small initial one will encounter a restoring force that is less than three times as large as the initial value.) The result is that the embodiment of FIGS. 10 through 12 will exhibit the desired acceleration of switch-closure alternations.

In the example cited, it requires two separate springs to achieve the pre-stressing effect. It can also be achieved with but a single spring. An example of a simple coil spring which is pre-stressed while mounted in an arrangement to bias a rotary member toward given angular positioning is given in my co-pending application No. 544,447 filed Apr. 22, 1966. (See FIGS. 7–9, spring 75.)

Invention scope and glossary notes

The generic nature of the invention should be clear from the variation in detail of the embodiments disclosed. Other and differing embodiments could have been included at the cost of burdening this application.

I do not use the term "switch contacts" so narrowly as to imply the necessary presence of contact "points" or "buttons." Any conductive surface may, in appropriate circumstances, serve as a switch contact.

I intend my term "electromagnetic means" to apply to any means which is capable of performing the stated function and which includes an electromagnet as a principal agency in that capability.

What I claim is:

1. For use with two horn circuits to be switched and with separate horn control circuitry supplying continuous D.C. electrical energization during selective intervals, a horn programmer including:

a passive mechanical oscillatory system comprising a rotatably mounted mass and means for biasing said mass toward predetermined angular positioning;

electromagnetic means electrically connectible to the horn control circuitry for stimulating the mechanical oscillatory system to execute a single decaying train of oscillations each time said control circuitry provides energization for an interval enduring at least as long as said oscillations persist; and two sets of switch contacts electrically connectible to the respective horn circuits and mechanically connected to the oscillatory system to be alternately closed by the operational oscillations of said system and to be both continuously closed after the dying out of said oscillations at least in the presence of continuing energization of the electromagnetic stimulating means.

2. The horn programmer of claim 1 in which the biasing means operable upon the rotatable mass is constructed to bias said mass with a force which is less than directly proportional to the angular excursion of said mass, whereby the oscillations of said mass are caused to occur with greater frequency as they decline in amplitude.

3. The horn programmer of claim 2:

further characterized in that the electromagnetic means applies its stimulus directly to the biasing means of the oscillatory system in the form of a change in the angular position toward which the rotatable mass is urged, such change persisting for the duration of the energization of said electromagnetic means; and further including a quench stop against which the rotatable mass is biased under quiescent conditions.

4. The horn programmer of claim 3 in which:

the biasing means in the oscillatory system includes two normally retracted sector springs adapted upon being advanced to bias the rotatable mass from opposing rotational directions toward angular positioning central of its permitted range of rotation;

the electromagnetic stimulating means includes armature means responsive to the electromagnet and linked to the sector springs to advance said springs for the duration of energization of said electromagnet; and the two sets of switch contacts are so mounted that each is closed only under the circumstances that the sector springs are advanced and the rotatable mass is in a corresponding given sector of its permitted range of rotational travel.

5. The horn programmer of claim 4 in which the means for stimulating the oscillatory system includes two separately acting armatures, each arranged to advance a respective one of the sector springs.

References Cited

UNITED STATES PATENTS 2,868,924  1/1959  Hewitt _____ 335—93
2,869,045  1/1959  Stephenson _____ 335—88

FOREIGN PATENTS 684,520  11/1939  Germany.

BERNARD A. GILHEANY, *Primary Examiner.*

H. BROOME, *Assistant Examiner.*

U.S. Cl. X.R.

335—252